Patented Mar. 28, 1944

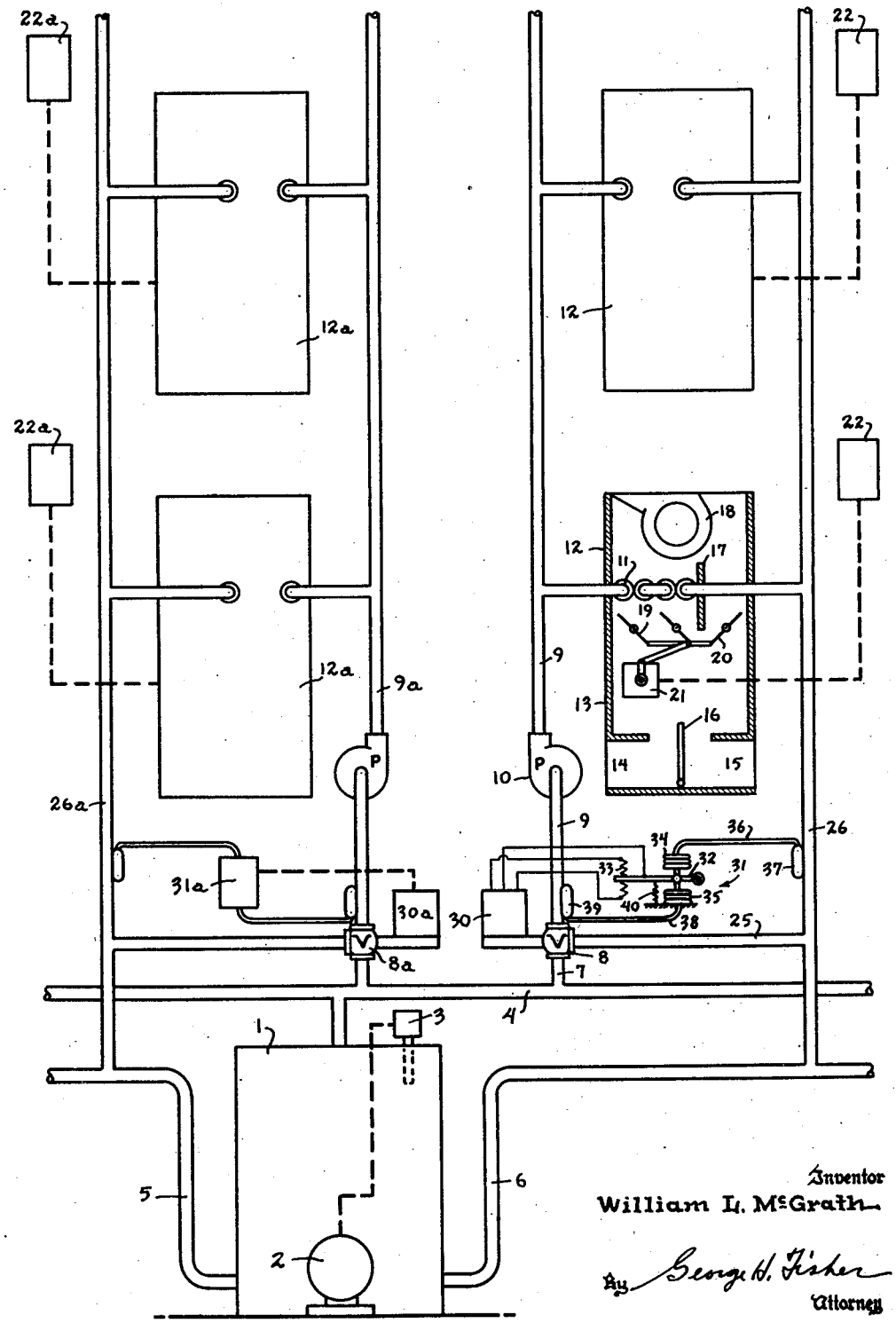

2,345,277

UNITED STATES PATENT OFFICE 2,345,277

AIR CONDITIONING SYSTEM

William L. McGrath, Philadelphia, Pa., assignor to Minneapolis-Honeywell Regulator Company, Minneapolis, Minn., a corporation of Delaware Application September 18, 1941, Serial No. 411,343

7 Claims. (Cl. 257—2)

This invention relates in general to heat exchange control and more particularly to automatic control systems for maintaining proper temperature conditions within a conditioned space.

In the heating art it has become common to heat rooms in buildings by means of devices known as unit ventilators. These unit ventilators consist of relatively small units which are located at the space being heated, each containing a heating coil and a fan for forcing a circulation of the air over the coil. The heating effect of these coils is usually controlled either by means of valves which control the flow of heating medium through the coils or by means of face and by-pass dampers which control the flow of air through the coils, these valves or dampers being graduatingly controlled by means of thermostats responsive to the temperature of the spaces being heated. Arrangements of this type have proven very satisfactory in operation when the heating load is appreciable. However in mild weather, assuming that a unit is of the damper controlled type, the controlling thermostat will act to completely close the face damper when the space temperature rises above a predetermined value, which will cause the supply of heat to the space to be entirely stopped. This will result in the space temperature dropping which will partially open the damper and will cause too much heat to be supplied to the space thus causing the space temperature to again rise which again causes complete closure of the face damper. Thus instead of providing proper modulating control, the thermostat causes the damper to constantly cycle between completely closed position and a partially open position. This causes warm and cold air to be alternately supplied to the space which causes discomfort of the occupants. This cycling also wastes heat due to the intermittent overheating action and also reduces the life of the thermostatic controls due to the continual operation.

It is an object of this invention to provide a system of the type mentioned which overcomes the difficulty described, providing proper control of the unit or units during mild weather as well as during cold weather. In accordance with this invention, the heating medium to the unit or units is controlled in response to the change in temperature of the medium passed through the coils, in addition to the control of the units in accordance with space temperature. This supplemental control reduces the effect for a given movement of the valve or damper by the controlling thermostat and provides a range of modulation of the valve or damper for any heating load while at the same time rendering the system capable of adjusting itself to carry the heating load regardless of whether it is large or small. In addition, this supplemental control, by lowering the temperature of the heating medium in mild weather diverses the heat dissipation from the piping and thus avoids any overheating from this cause.

While the invention is of particular utility and is described in particular as applied to control of heating, it is equally adapted for control of cooling. Also, while the invention is described as applied to a system for controlling building temperature it is not limited to this branch in the art of heat exchange but is of broad application.

Other objects of the invention will appear from the following description and the appended claims.

For a full disclosure of this invention reference is made to the following description and to the accompanying drawing, the single figure of which illustrates diagrammatically the invention as applied to a heating system.

Referring to the drawing, reference character 1 indicates a hot water boiler having a firing means such as an oil burner 2 which is controlled by a thermostat 3 responsive to the temperature of the heated water. This boiler is connected to a supply main 4 which conveys heated water to the various zones and is also provided with return mains 5 and 6. The supply main 4 is connected by a pipe 7 to one inlet of a three-way valve 8 and the discharge of this valve 8 is connected to a branch main 9 which includes a circulator 10. This branch main 9 is connected to the heating coils 11 of unit ventilator devices 12.

The unit ventilators 12 may be of usual construction and may each consist of a casing 13 having openings 14 and 15 for admission of fresh and recirculated air, the proportions being controlled by a damper 16. The unit ventilators 12 also may each be provided with a partition such as 17 which forms a by-pass passage for the air around the heating coil 11. Each unit ventilator also is provided with a fan such as 18 for forcing circulation of air therethrough. The control of air through the heating coil 11 and the by-pass passage of each unit ventilator may be controlled by means of a face damper 19 and a by-pass damper 20 which are actuated in unison but in inverse order by means of a motor 21. This motor may be of the type shown and described in the Taylor Patent 2,028,110 and may be controlled by means of a thermostat 22 which responds to the temperature of the space heated by the corresponding unit ventilator. With the arrangement described, upon decrease in temperature the motor 21 will position dampers 19 and 20 so as to increase the flow of air through coil 11 thereby increasing the heating effect of the unit ventilator. Conversely, upon increase in temperature the thermostat 22 will operate to decrease the flow of air through coil 11 thereby decreasing the amount of heating performed.

In systems as heretofore used the coil 11 of each unit ventilator remains at constant temperature. This causes improper operation during mild weather, for a very slight opening of the face damper 19 will provide appreciable heating, thus causing overheating of the space whenever the thermostat opens the face damper even slightly. This causes the face damper 19 to be continually shifted by the motor 21 from completely closed position to slightly open position and back to closed position which results in alternately supplying warm and cold air to the space which is undesirable.

The three-way valve 8 is provided for the purpose of avoiding the undesirable action just described. This three-way valve includes a second inlet which is connected by pipe 25 with the branch return main 26 which leads from the outlet of the coils in unit ventilators 12 to the return main 6. It will be apparent that by positioning the three-way valve 8 the proportions of heated water from the main 4 and the recirculated water from pipe 25 may be varied for thereby varying the temperature of the water being delivered to the coils of the unit ventilators.

The three-way valve 8 is positioned by means of a proportioning motor 30 which may be of the type disclosed in the aforementioned Taylor patent. This proportioning motor is controlled by means of a differential controller generally indicated at 31. This controller is diagrammatically illustrated as consisting of a pivoted lever arm 32 which forms a slider cooperating with a resistance 33 to form a control potentiometer for the proportioning motor 30. This lever is actuated by opposed bellows 34 and 35. The bellows 34 is connected by a capillary tube 36 to a control bulb 37 mounted upon the branch return main 26. This causes the pressure within bellows 34 to vary in accordance with the temperature of the return water. The bellows 35 is connected by a capillary tube 38 to a control bulb 39 which responds to the temperature of the water flowing through the supply branch main 9. As the bellows 34 and 35 act in opposition it will be apparent that the slider 32 is positioned upon resistance 33 in accordance with the differential in temperature between the water being supplied to the heating coils of the ventilators and the water leaving said coils. The controller 31 may also be provided with a biasing spring 40 for determining the differential in temperature maintained between the supply and return branch mains.

The ends of resistence 33 and the slider 32 of controller 31 are connected to the proportioning motor 30. This causes the proportioning motor 30 to position the three-way valve 8 proportionately to the position of slider 32 upon resistance 33. Thus if slider 32 engages the center of resistance 33 the proportioning motor will cause the valve 8 to assume mid position wherein equal amounts of hot and recirculated water are supplied to the unit ventilators. If the slider 32 engages the lower end of resistance 33, the motor 30 will position valve 8 so as to supply all recirculated water to the branch main 9, and if the slider 32 engages the upper end of resistance 33 the motor 30 will position valve 8 at its opposite extremity wherein all hot water is supplied to the branch supply main 9.

Operation

In operation, assuming that the heating load upon the system is at a maximum, the various thermostats 22 will position the dampers of the unit ventilators for causing a maximum flow of air across the heating coils. This will cause the water in flowing through the heating coils to be cooled considerably which will result in the slider 32 engaging the upper end of resistance 33 for supplying all heated water to the heating elements. As the load upon the system decreases, the thermostats 22 will reduce the flow of air across the various heating elements 11. This reduction in air flow across the coils will reduce the amount of heat removed from the water in passing through the coils thus causing the differential between the supply and return water to decrease. This will cause movement of the slider 32 downwardly across resistance 33 for causing the proportioning motor 30 to position valve 8 for admitting recirculated water from the pipe 25 to the branch supply main 9. This position of the valve 8 will thus lower the temperature of the water being supplied to the unit ventilators. It will be apparent that as the output of the unit ventilators is continually decreased in response to decrease in load, the differential in temperature between the supply and return water will continue to decrease which will cause the valve 8 to increase more and more the proportion of recirculated water. Thus during mild weather when only very little heat is withdrawn from the circulated water by the heating coils 11, the three-way valve 8 will be positioned for supplying only a small amount of hot water to the heating coils which will cause these heating coils to operate at relatively low temperature. Due to these heating coils operating at the low temperature, the thermostats 22 may open the face dampers 19 appreciably without overheating the space and thus true modulating control is obtained down to a minimum heat output.

In utilizing this invention the building may be divided into zones having different heating requirements and the temperature of the water supplied to each zone may be varied by separate three-way valves which are controlled by the differential in temperature between the supply and return water. Thus if desired, an additional zone may be utilized consisting of unit ventilators 12a which are controlled by means of thermostats 22a, these ventilators being connected to branch supply and return mains 9a and 26a. This additional zone may be controlled by a separate three-way valve 8a which is positioned by a proportioning motor 30a under the control of a differential thermostat 31a.

From the foregoing description it will be apparent that the present invention provides for automatically reducing the temperature of the heating coils of the unit ventilators in response to the heating load upon the system for thereby permitting the controlling dampers to be opened appreciably even in mild weather without causing overheating of the space and thus provides for true modulation of the heating throughout the entire control range. While the invention is particularly applicable to heating systems, it may also be used in cooling systems and in other types of heat exchange systems generally. While I have shown and described a preferred form of the invention, it will be apparent that many changes may be made without departing from the scope of the invention. I therefore desire to be limited only by the scope of the appended claims.

I claim as my invention:

1. In a system of the class described, in combination, a heat exchange device through which heat exchange fluid is passed for controlling the temperature of a medium, a first controller for graduatingly controlling the flow of said medium across said heat exchange device, a second controller for controlling the temperature of the heat exchange fluid circulated through said heat exchange device, and means responsive to the differential in temperature of the heat exchange fluid before and after it flows through said heat exchange device for controlling said second controller.

2. In a system of the class described, in combination, a heat exchange device through which heat exchange fluid is passed, means for passing air over said device and to a space to be conditioned, temperature responsive means for controlling the transfer of heat from said heat exchange device to said air, means for varying the temperature of the heat exchange fluid supplied to said heat exchange device, and means responsive to the differential in temperature of the heat exchange fluid before and after it flows through said heat exchange device for controlling said last mentioned means in a manner to reduce its heat exchange capacity upon a decrease in said temperature differential.

3. In a temperature controlling system for a space, in combination, a conditioning chamber through which air supplied to the space is passed, a heat exchange device in said conditioning chamber, a controller for varying the flow of air through said conditioning chamber, means responsive to space temperature for controlling said controller to vary the flow of air through said heat exchange device in a manner tending to maintain the space temperature constant, means for supplying heat exchange fluid to said heat exchange device, means including valve means for introducing heat exchange fluid which has passed through said heat exchange device into the heat exchange fluid being passed to said heat exchange device for changing the temperature of the fluid delivered to said heat exchange device, and means responsive to the differential in temperature of the heat exchange fluid before and after it passes through said heat exchange device for controlling said valve means.

4. In a system of the class described, in combination, a plurality of heat exchange devices, common supply and return conduits for said heat exchange devices for circulating heat exchange fluid through said devices, controllers associated with each of said heat exchange devices for individually controlling the action of each of said heat exchange devices, a controller for varying the temperature of the heat exchange medium supplied to said heat exchange devices, and means responsive to the difference in temperature between the heat exchange medium in said supply and return conduits for controlling said last mentioned controller.

5. In a system of the class described, in combination, a plurality of heat exchange devices associated with a plurality of different locations to be conditioned, common supply and return conduits for circulating heat exchange fluid through said heat exchange devices, means for passing air over each of said heat exchange devices, controllers associated with each of said heat exchange devices for controlling the flow of air through said devices in a manner tending to maintain proper temperature conditions at the various locations, valve means associated with said supply and return conduits for introducing different proportions of heat exchange fluid from said return conduit into said supply conduit to thereby change the temperature of the fluid supplied to said heat exchange devices, and means responsive to the difference in temperature of the heat exchange fluid in the supply and return conduits for controlling said valve means.

6. In a heating system for a space, in combination, a radiating element, means for controlling the quantity of air passing over said radiating element, thermostatic means responsive to the temperature of the space in control of said last-named means, means for supplying a heated fluid to said radiating element including a connection for returning to said element fluid which has already passed therethrough, valve means arranged to vary the proportions of heated and recirculated fluid supplied to said radiating element, and means responsive to the difference in temperature between the heated fluid and the fluid leaving said radiating element for operating said valve means in a manner to supply less heated fluid and more recirculated fluid upon a decrease in such temperature differential.

7. In a system of the class described, in combination, a heat exchange device through which heat exchange fluid is passed for controlling the temperature of a medium, a first controller for graduatingly controlling the flow of said medium across said heat exchange device, a second controller for controlling the temperature of the heat exchange fluid circulated through said heat exchange device, and means responsive to the differential in temperature of the heat exchange fluid before and after it flows through said heat exchange device for controlling said second controller, the rate of circulation of said heat exchange fluid remaining substantially constant throughout the heating period.

WILLIAM L. McGRATH.